United States Patent [19]

Austin

[11] 4,246,885
[45] Jan. 27, 1981

[54] SOLAR ENERGY COMPRESSOR SYSTEM

[76] Inventor: James W. Austin, 1400 Orange St., Melbourne Beach, Fla. 32951

[21] Appl. No.: 899,473

[22] Filed: Apr. 24, 1978

[51] Int. Cl.³ .............................................. F24J 3/02
[52] U.S. Cl. .................................... 126/417; 126/448; 126/435
[58] Field of Search ............... 126/270, 271, 418, 417, 126/421, 422, 435, 442, 443, 446, 448, 451, 452, 900; 60/641

[56] References Cited

U.S. PATENT DOCUMENTS

| 3,473,348 | 10/1969 | Bottum | 165/154 X |
| 3,734,174 | 5/1973 | Bloxham et al. | 165/154 |
| 3,989,417 | 11/1976 | Neidigh | 60/641 |
| 4,010,732 | 3/1977 | Sawata et al. | 60/641 X |
| 4,054,981 | 10/1977 | Bridgegum | 165/154 X |
| 4,094,146 | 6/1978 | Schweitzer | 60/641 |
| 4,142,512 | 3/1979 | Brown | 126/271 |
| 4,150,547 | 4/1977 | Hobson | 165/104 S X |

Primary Examiner—James C. Yeung
Assistant Examiner—Larry Jones
Attorney, Agent, or Firm—Gipple & Hale

[57] ABSTRACT

A solar collector compressor apparatus for heating and compression of a gas is disclosed in several forms. In one form the compressor is formed of serially connected solar heated heat exchanger tubes. The tubes are connected by pressure responsive valves. In an alternate form solar heated compression tubes are located at the focus of a concentrating reflector. In an additional embodiment a centrally located reflector progressively directs solar energy onto a serially connected ring of absorber units each of which mechanically compresses a gas.

4 Claims, 8 Drawing Figures

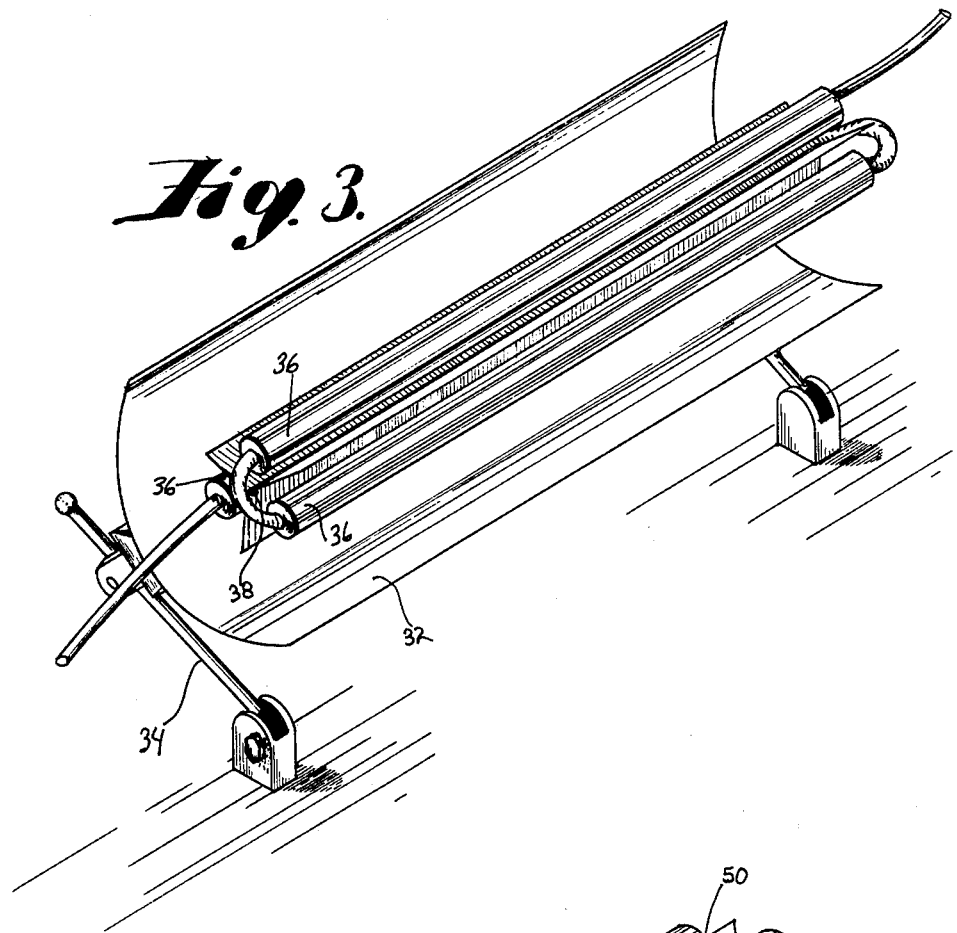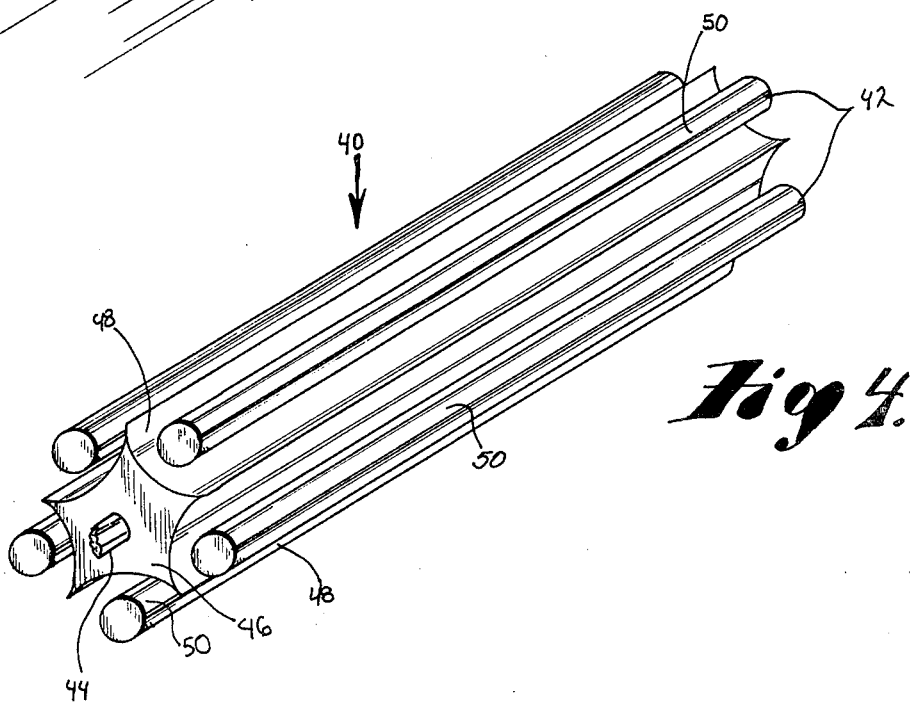

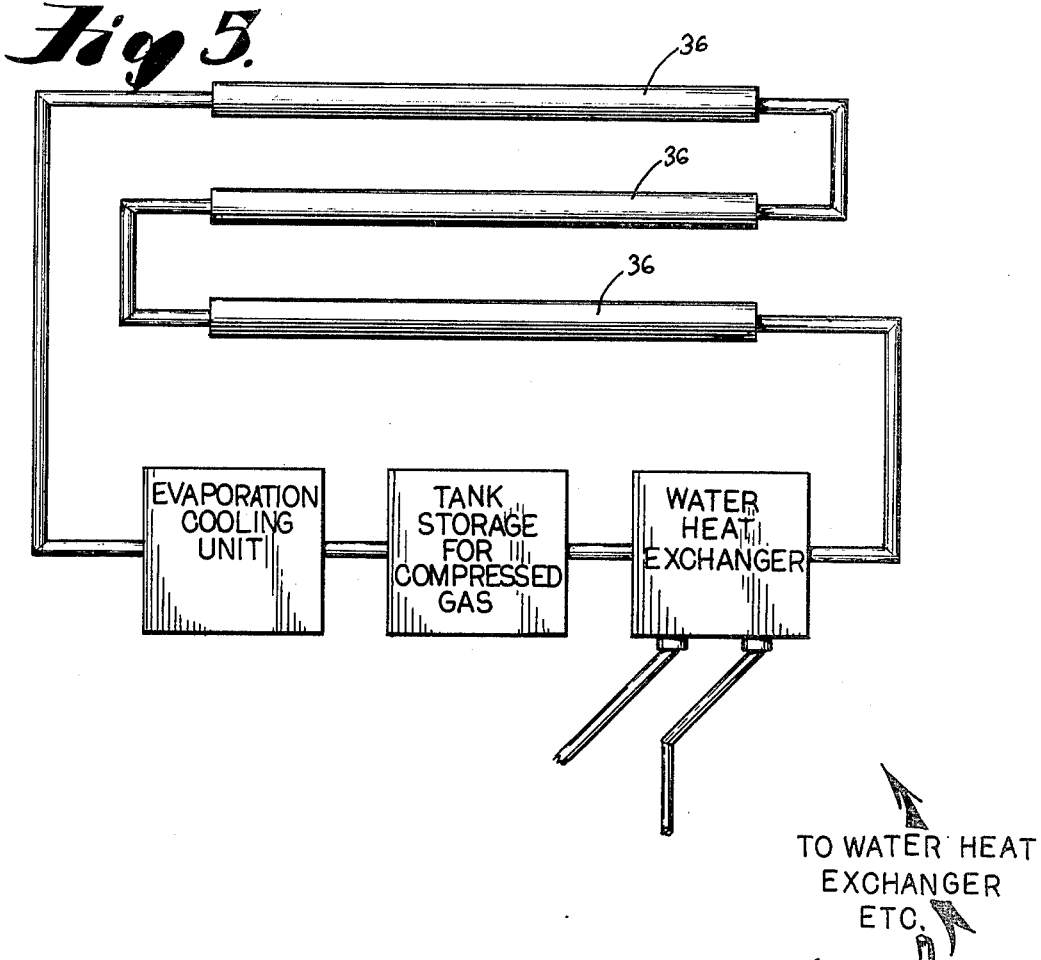
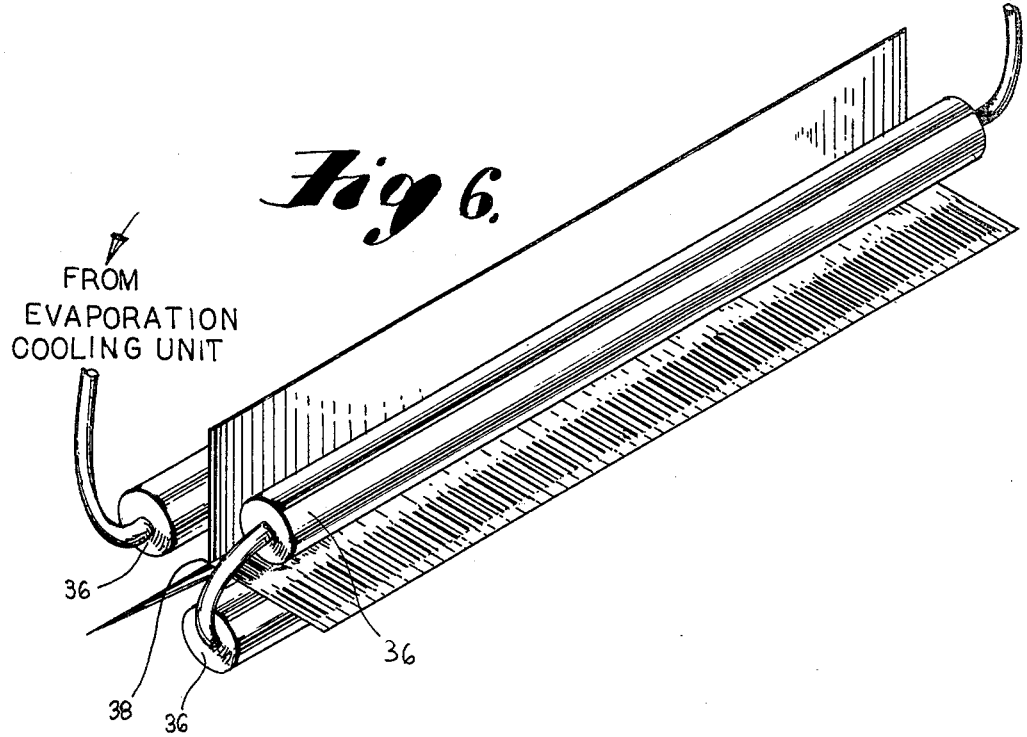

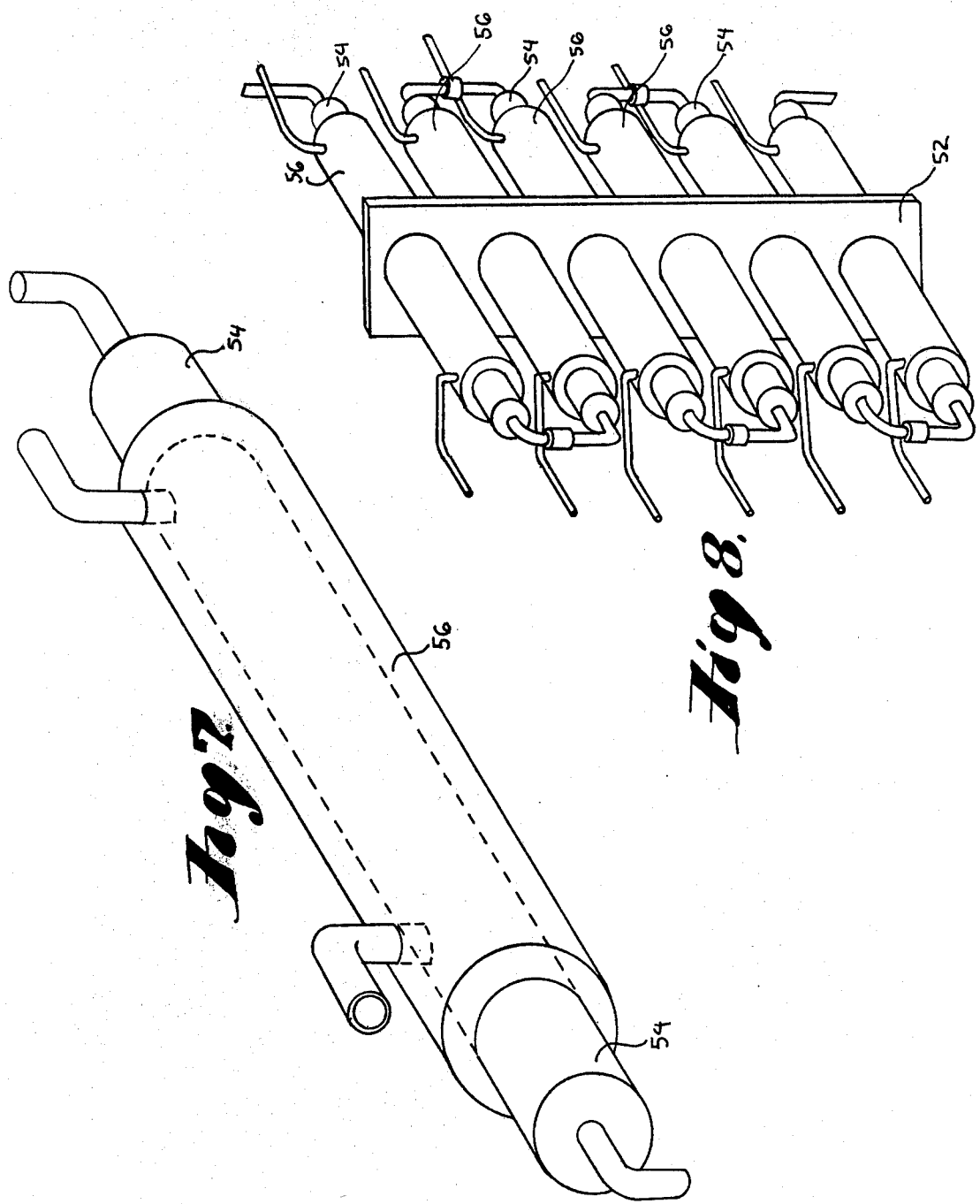

SOLAR ENERGY COMPRESSOR SYSTEM

BACKGROUND OF THE INVENTION

This invention relates to a solar energy system comprising a cassegrain sun-tracking collector associated with a mirror focusing system which directs focused solar energy to an air compressor. The constant flow compressor utilizes the solar heat to convert or expand a gas into compressed gas. A refrigerator or cooling system, a hot water system, and electrical generation utilizing conventional solar cells can all be powered by this invention. The solar energy system disclosed herein employs well-known physical and chemical properties and principles in a novel arrangement so that the heat from the sun can be converted into a means for cooling in addition to providing electricity by the use of conventional solar cells.

DESCRIPTION OF THE PRIOR ART

Many of the inventions disclosed in the plethora of United States patents dealing with solar energy utilize the heat from the sun and convert the same to a means or apparatus for heating a particular dwelling. These prior art devices basically utilize conventional solar cells which further comprise novel combinations of copper tubing, black tubing, and thin metals which absorb the heat from the sun and then transfer the same to water passing through the system's pipes. The prior art, however, is totally devoid of a method or apparatus for converting the heat from the sun into a means or apparatus for providing refrigeration or cooling means. The present invention, however, is a significant advance over the prior art and serves to convert the warmth or heat provided by the sun's rays into a cooling or freezer system.

The solar systems disclosed by the prior art references generally incorporate the utilization of conventional solar cells on the tops of buildings or house roofs. While the utilization of building rooftops provides a large surface area for the collection of the heat from the sun, this method of collection is seriously hampered when the sun "tracks" across the sky. More sophisticated systems, however, incorporate mechanical means for varying the angle of the rooftop as the time of day changes. In this manner, the maximum surface area of the rooftop containing the solar cells is always at an optimum angle with respect to the sun's rays. The present system, disclosed herein, eliminates the disadvantages inherent within the varying rooftop angular type systems by employing an axially rotatable solar collecting mirror in combination with a rotatable series of solar connecting cells located around the periphery of a wheel-like member.

The present system eliminates the heavy mechanical structure which is necessary to change the relative angle of a rooftop with solar collecting cells supported thereon.

The details of the present invention will be more fully described in the specification and description of the drawings.

The prior art methods and apparatus for converting the solar heat radiated from the sun into thermal or heat energy are generally useful for a singular purpose, generally heating. The present invention, however, offers significant advantages over the prior art by converting the heat emitted from the sun into a plurality of uses; for example, air conditioning, a refrigerating or freezer system and electricity generation by means of utilizing a plastic type steam engine.

SUMMARY OF THE INVENTION

The present invention is directed to a method and apparatus for converting the heat from the sun into compressed fluid or gas for future use in a home or industrial environment for refrigeration or heating means. The system comprises a means for collecting the sun's rays in a highly efficient manner and a means for heating and consequent compression of the fluid being heated. This is accomplished by utilization of a plurality of compression tubes containing fluid which are heated until a predetermined temperature or pressure is obtained whereupon a check valve will release the fluid from within the compression tube. Subsequently, the fluid is passed through a heat exchanger. After the heat exchange process is accomplished the fluid is passed into a successive tube until the predetermined pressure is again reached by the heating of the sun's rays.

More specifically, the present invention comprises a constant flow compressor serving to convert focused sunlight onto a compressed gas. A solar wheel is provided with a plurality of cell units which serve as targets for the concentration of the sun's rays. A mirror and suitable drive motor serves to direct the sun's rays onto the cells in a seriatem manner. The heat from the sun's rays is directed to a metallic diaphragm which upon heating, heats the gas in the cell and expands into the solar cell serving to expand and compress a gas or fluid contained within the cell. This heating and compression will occur until a predetermined pressure is reached whereupon the fluid will pass through a check valve and into the next subsequent solar cell. Before the fluid or gas, however, is passed into the next successive solar cell, heat exchange means is utilized to collect the heat from the previously compressed and heated fluid. The ultimate product of the solar wheel is a storage tank of super compressed gas which can be subsequently utilized for refrigeration or heating means. The refrigerating process can be utilized by subsequent expansion of the now compressed fluid or gas. Alternate embodiments are described for efficient and economical collection and utilization of the sun's rays. Additionally, the present invention contemplates the use of the sun's heat to provide a supply of electricity and potentially provide a source of energy for operation of a plastic steam engine.

BRIEF DESCRIPTION OF THE DRAWINGS

FIG. 3 discloses an alternate embodiment of a solar collecting cell having three axially rotatable fluid carrying tubes;

FIG. 4 is an alternate embodiment of a solar collector cell having a plurality of fluid carrying tubes;

FIG. 5 is a schematic view of the present invention illustrating how the heat from the sun can be collected by a plurality of fluid containing tubes and consequently converted into a means for providing refrigeration or cooling in addition to providing hot water; and, FIG. 6 is an enlarged perspective view of the fluid carrying tubes shown in FIG. 3, FIG. 7 is an alternate embodiment of a solar collector cell;

FIG. 8 is a perspective view of a plurality of the solar collecting cells of FIG. 7, coupled in series.

DETAILED DESCRIPTION OF THE DRAWINGS

An initial focusing system (not shown) comprises a sun tracking system with a single axis-mount mirror or reflecting means provided with a clock motor drive which serves to follow the track of the sun during a day. The sun tracking system comprises a large parabolic mirror which serves to initially collect the sun's rays and concentrate the rays and heat from the sun onto a second convex-shaped mirror or reflecting surface located proximate to the focal point of the initial parabolic mirror. The initial concentrating parabolic mirror is supported on a pedestal which is provided with three legs. A variable height adjustment of one of the legs will serve to compensate for seasonal sun movement (north-south). As previously mentioned, the main reflector, or initial solar collector, will be a parabolic mirror. The convex collector or reflector is an appropriate hyperbolic mirror which serves to focus the initially collected energy behind the larger parabolic mirror. In this manner, heat or the sun's rays collected by the large mirror will first be concentrated at its focal point whereupon it is reflected by the hypervolic mirror, there located, and consequently reflected behind the initial large collecting mirror.

The sun's rays are then further reflected by a planar mirror which is preferably located at approximately forty-five degrees to the horizontal. The planar mirror is located and supported upon a rotating support which is driven by a motor. The motor serves to rotate the planar mirror and consequently redirects the sun's rays circumferentially around the circumference of a solar wheel. In this manner, the heat will first be collected, concentrated and then redirected around the periphery of the solar wheel so that the heat and sun's rays collected will be utilized in a most efficient manner.

Figure 1:
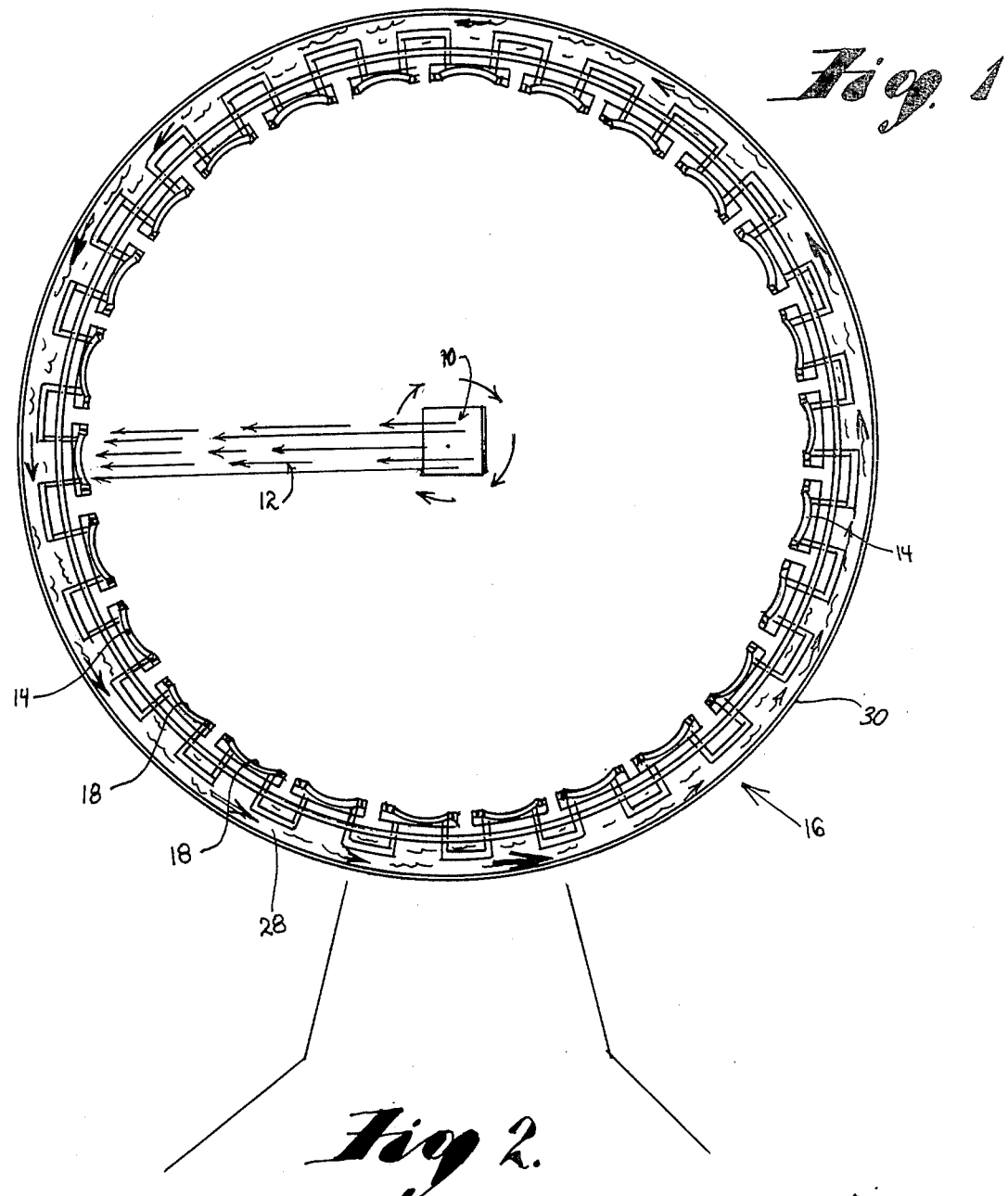
FIG. 1 is a top view of the wheel of the present solar system with arrows illustrating the direction of rotation of a mirror and the reflection of the sun's rays. Furthermore, additional arrows rotating around the periphery of the mirror serve to indicate the flow of fluid.

As best shown in FIG. 1, the planar mirror 10 is clearly illustrated as being capable of rotating about 360 degrees so that the sun's rays 12 will be directed toward the collecting surface of the solar cells 14, said cells being connected in series and located about the periphery of the solar wheel 16. As just mentioned, the sun is initially collected by a large parabolic mirror, concentrated upon a hyperbolic mirror which further reflects the rays onto a forty-five degree mirror, having a planar configuration 10. The planar mirror 10 is rotatable upon a vertical axis by a motor. The sun's rays are thus concentrated upon the collecting surfaces of the solar cells 14 and as the motor drives the rotation of the planar mirror, the sun's rays and its heat will be concentrated upon successive and adjacent collecting surfaces of adjacent solar cells. In an alternate embodiment the forty-five degree planar mirror 10 can be held stationary while the solar wheel 16, comprising the solar cells 14, can be rotated about its central axis.

Figure 2:
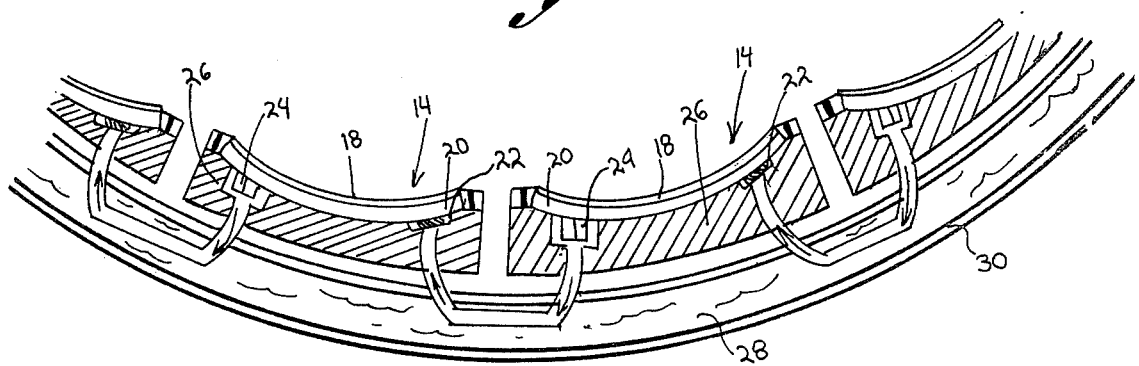
FIG. 2 is an enlarged view of one portion of the periphery of the wheel, clearly showing the detailed structure of a plurality of solar collecting cells of the present invention.

As best seen in FIG. 2, the individual solar cells 14 each possess a thin collecting membrane 18. The collecting membrane is, in the preferred embodiment, 0.015 inches thick of aluminum sheet. As the sun's heat is concentrated upon the thin aluminum membrane or collecting membrane 18, the membrane will heat the contained gas which will increase its pressure, expand due to its predetermined coefficient of expansion and consequently compress any fluid or air contained within the chamber 20, located immediately behind the collecting membrane 18. The chamber 20 is, in reality, a compression chamber wherein a fluid or gas is allowed to be compressed when the collecting membrane is expanded by the heat from the sun being concentrated upon its collecting surface. The chambers 20 are provided with check valves 22 and 24 which serve to seal the intake of fluid within the chamber and also serve to prevent backflow of fluid from a cell located upstream from the initial cell.

Thus it can be seen that when heat is applied to the membrane 18, the thermal energy of the sun is transferred to the gas or fluid located within the chamber 20 raising its pressure, the individual solar cells also act as diaphram-like pumps. The body 26 of the cell 14 is preferably an insulation type material in order to significantly prevent or retard heat loss. The arrows shown in FIG. 2 clearly illustrate the direction of the fluid flow from one solar cell to the next. As the heated or compressed fluid passes from one cell to the next cell, a second fluid contained around the outside periphery of the solar wheel 16 travels in the reverse direction of the initial fluid contained within the outer periphery 30 of the solar wheel 16 serves to collect the heat from the super-compressed and heated fluid contained within the internal fluid lines 28.

It will be appreciated that in studies of the solar cells disclosed herein, a propane torch held, for a period of ten seconds, so that the flame was proximal to the 0.015 inch thick aluminum collecting membrane significantly raised the pressure of the air or fluid captured within the chamber 20. Experiments have indicated that the pressure obtained is equivalent to 21 PSIG. The actual pressure would have been higher as the air inside the gauge mechanism was not directly heated.

As shown in FIG. 1, the compressor would comprise a plurality of these solar cells arranged in a circular fashion. Each cell would exhaust its now compressed gas through the pressure check valve and into the next cell. The appropriate check valves serve to prevent backflow and permit inflow of fluid between the cells. The gas or fluid contained within the internal fluid lines 28 will thus flow from the first cell to the next cell to each succeeding cell. The original heat source, of course, is the aforementioned sun which has been concentrated and focused by the previously described parabolic and hyperbolic mirror system in conjunction with the planar mirror 10 rotatable upon a vertical axis by a motor. In the preferred embodiment the mirror is rotated at the appropriate rate to obtain the optimum temperature at the collecting membrane of each solar cell. It is considered important to note that the fluid contained within the periphery 30 of the solar wheel 16 serves as a heat exchanger in order to cool the gas or fluid held within the internal fluid lines.

The compressed gas ultimately resulting from this compressor is preferably stored in a storage tank. The preferred embodiment contemplates the compressed gas comprising ammonia which has a boiling point of approximately $-33°$ F. Of course, it will be appreciated that any refrigerant could be utilized.

Consequently, it can be seen that a refrigerator or cooling apparatus can be employed utilizing compressed gas that is essentially driven by the heat emitted by a solar source. A refrigerator can be made that is essentially an ice box. The ice box comprises a suitable container of water with coils inside for expanding the ammonia gas which previously has been super-compressed by the aforementioned solar wheel 16. The container thus becomes a block of ice which consequently serves to cool and therefore act as a refrigerator.

A freezer can also be operated by utilizing the same compressed ammonia gas. The freezer, however, will be substantially the same as the previously described refrigerator except that the container of water of said refrigerator will now have an expansion valve inside with the ammonia gas and some liquid ammonia in the container. The temperature in the freezer would be approximately $-33°$ F. Stored liquid ammonia could be used as a reserve for overnight use when the solar heat is unavailable and the super-compressed ammonia in the tank could be another back-up reserve when no solar energy is available. Controls to maintain the proper temperature could be accomplished by conventional temperature sensing devices to control the valving of the ammonia.

Another possible use for the previously described solar system comprises a heat exchanger for the compressor wherein considerable quantitites of hot water can be produced at approximately 175° F. or greater. Where hot water is the ultimate requirement, the rotating mirror can be moved or pivoted away such that it does not intersect the reflected solar light beam. The thus focused solar light rays will then illuminate upon and consequently heat a heat sink arrangement. Water can then be circulated through the heat sink at a rate to obtain steam or water at whatever temperature may be required or desired.

It will be additionally appreciated that the solar cells of the present invention can also be used in conjunction with conventional solar cells in order to produce electricity. Solar diodes, such as gallium arsenide diodes, being developed by Varian Associates in Palo Alto, Calif., require a focused system for higher light level illuminations than ambient. These diodes require a high capacity heat sink. The Diodes can be mounted on the surfaces of the collecting membranes 18 of the solar wheel 16 or alternately on the heated surface of the hot water heat sink in order to directly generate electricity. The efficiency of this scheme would be quite high as in the compressor system as the hot water is really fall-out from the heat exchanger and the diaphram of each compressor will heat the solar diodes so that different sources of energy are obtained from a single in-put. The solar diode out-put could also supply enough electricity to charge a battery which could power the drive motor for suntracking, thereby eliminating the need for an external power source for the movement of the planar mirror 10.

Generating steam by the direct heating of water could result with the proper flow rate of water. Machining any material to manufacture a steam engine could quite possibly be cost prohibitive. However, if a design is proven all parts could be injection molded from plastic, thereby reducing the costs considerably. A plastic now available which has the necessary temperature versus strength and injection molding capability is Torlon. Electrical generation by means of this plastic steam engine is thus possible. The engine will serve to drive an alternator or generator to generate A.C. or D.C. electrical energy. The engine should be of a uniform design with low head space for high energy efficiency, and also operating under subatmospheric pressure. It will be appreciated that other applications requiring mechanical energy could use this power source.

An alternate embodiment of a solar collector system is disclosed in FIG. 4. The collector system 36 comprises a trough-shaped reflector 32 with a support means 34. The support means serves to support the trough-shaped reflector on a roof top. Located at the focal point of the parabolic trough-shaped reflector 32 are a plurality of compressor tubes 36. The compressor tubes are interconnected to one another so that a fluid will pass through one tube to the next tube to the third and final tube in a continuous manner. The compressor tubes 36 rotate about a fixed axis 38 which axis is parallel to the loci of focal point of the parabolic shaped reflector. As best seen in FIG. 3, the sun's rays will be initially collected by the trough-shaped reflector 32 and reflected to the focal point of said reflector. Located at the focal point of the reflector is one of the compressor tubes which contains a fluid. The reflected sun's rays will serve to substantially heat the fluid contained therein until the pressure within the compressor tube reaches a critical point whereupon a check valve located at each end of the tube will allow the fluid to flow from the compressor tube through a heat exchanger and then into the next compressor tube. During the heat exchange process between the first compressor tube and the heat exchanger, the subsequent compressor tube 36 will be rotated about axis 38 such that it is now located at the focal point of the parabolic trough-shaped reflector 32. Suitable check valves will be located at both ends of each compressor tube as will the conventional heat exchanger means. The perpetual process of heating the fluid within the compressor tubes, heat exchanging, and subsequent rotation of a different compressor tube into the appropriate position with respect to the trough-shaped reflector will result in a super compressed gas which can be subsequently expanded for refrigeration or air conditioning purposes. Additionally, the heat exchange process occuring between each stage for heating of a different compressor tube will serve to provide a supply of hot water.

These rotating collector/compressor arrangements can be laid out in series in order to get the capacity required for an entire system. Several units could be rotated by a single drive system. Their low profile would serve to allow a light transparent covering for protection from weather and wind. In the preferred embodiment, the height of the trough-shaped collector is approximately two feet.

The operation of the parabolic shaped trough with the previously described compressor scheme located at the focal point of the parabola will now be discussed. Three compressor tubes 36 rotated or indexed at the focal point of the trough-shaped reflector 32 are rotatable about an axis 38. The tube will be maintained at the focal point a period of time sufficiently long to enable the fluid contained within the compressor tubes 36 to attain the optimum temperature rise. The heated fluid in the compressor tube will then flow through a check valve into the next tube. The assembly will then rotate such that the next tube is moved to the focal point whereupon the heat from the sun's rays will serve to heat the fluid contained within this next tube. The heating will cause expansion and continued flow through this tube's check valve. The tube which has just moved out of the focal point will cool by means of a heat exchanger and the pressure will thus drop. The check valve arrangement allows the tubes to draw more gas from a supply of fluid.

In an alternate embodiment of the solar collector the parabolic shaped trough and compressor tubes are replaced by a plurality of parabolic surfaces and compressor tubes as best illustrated in FIG. 4. The solar collecting means 40 is comprised of a plurality of interconnected compressor tubes 42 which are rotated about a longitudinal axis 44 by a suitable drive means, not shown. A star shaped wheel 46 rotates about the axis 44. The star shaped wheel is comprised of a plurality of parabolic shaped surfaces 48. Located at the focal point of each parabolic shaped surface is a compressor tube 50. As in the previously described embodiments, the compressor tubes are provided with pressure check valves and heat exchanger menas. In operation, the heat from the sun's rays will be directed toward the parabolic shaped surface 48 whereupon it will be reflected and concentrated on the compressor tube 50 which is located at the focal point of the parabolic shaped surface of 48. Heating and consequent pressure rise will thus occur until the check valve release point is reached whereupon the fluid is released to a heat exchanger means. The star shaped wheel 46 will then rotate such that the next succeeding compressor tube 50 and corresponding parabolic shaped surface 48 will be in the proper position for receiving the heat from the sun's rays. Obviously, this process is continuous and relatively perpetual and therefore a compressed fluid will be provided which can be subsequently expanded for refrigeration or air conditioning purposes as previously described. The axis 44 is preferably parallel to the north/south axis such that the parabolic shaped surfaces 48 rotate through the east/west track of the sun during the earth's rotation.

FIG. 5 descloses the schematic operation of the solar collecting means disclosed and shown in FIG. 3 or 4 with only three compressor tubes being shown. It can be seen that fluid held within the first tube located at the focal point of the reflector will be heated until the pressure within the tube reaches a predetermined minimum value whereupon the fluid will be passed through the check valve located at one end of the compressor tube. Subsequently, the fluid will pass into the second tube whereupon the same heating process will occur. When the fluid is thus held within the final compressor tube the fluid will be heated until it reaches a high compressive state whereupon the final check valve will be released which serves to pass the super compressed fluid into a water heat exchanger. The water heat exchanger serves to provide a continuous source of hot water for a factory or home as desired. The super compressed gas can be stored in a storage tank and subsequently expanded for refrigeration or air conditioning purposes as schematically represented by the evaporation and cooling unit. It will be appreciated that as the fluid passes from the initial compressor tube through the check valve a partial vacuum will be formed relative to the atmosphere within the initial tube. This partial vacuum will serve to draw into the initial tube an amount of additional fluid for future reheating and compression purposes. Thus, the system serves as a type of pump of fluid into the system itself.

The arrangement and systems previously described can be fully integrated into existing air conditioning and refrigeration equipment by setting up an automatic by-pass arrangement. The equipment can thus operate normally when no sloar power is available. Equipment designed for solar operation only can use a gas storage for overnight use. Cooling units could be installed within each room with a refrigerant piping system.

A flat plate collector compressor system suitable for refrigeration equipment is best shown in FIG. 7. The flat plate collector comprises a rectangular element 52 which contains a plurality of compressor tubes 54. The compressor tubes are interconnected to one another with suitable check valve means serving to provide fluid flow from one tube to the next tube when a predetermined pressure is reached in the first tube. Each compressor tube is provided with a jacket 56 in the form of an outer tube. The jackets 56 are provided with appropriate inlet and outlet connecting mechanisms such that a fluid can be passed into the jacket 56 and out of the jacket 56. In this manner, the jacket 56 serves as a heat exchanger for the heat provided by the compressor tubes. These flat plate collector compressor systems can be suitably mounted on a conventional flat plate collector such as are now being manufactured by many companies. In operation, the compressor tubes are heated by the sun's rays whereupon the pressure within each compressor tube is increased until a minimum pressure is reached whereupon the fluid will pass through the check valve and into the next downstream compressor tube. The jackets 56 serve as a heat exchanger means. The ultimate product of the flat plate collector compressor systems is a source of compressed gas which can be subsequently used for refrigeration or cooling means as previously described. In the preferred embodiment, the jacket is filled with water. As the fluid within the inner tube is cooled by the heat exchanger or jacket a partial vacuum will be formed within the inner tubes which vacuum serves to pump or draw fluid from a source. Compression is caused by repetition of heating and subsequent cooling intermittently with cooled water, so that the fluid in each tube is more compressed than in the previous upstream tube feeding it. Thus it can be seen that the need for solar tracking is eliminated. The flat plate collector compressor system would be ideally suited for the heating or cooling as desired of an external swimming pool. In Florida, swimming pools in the suburbs reach temperatures of 95° to 100° F. Cooling the pool water in summer would be economically feasible if a winter pool heater of the same design were employed. Additionally, the flat plate collector compressor system could be utilized on larger power and sail boats which could use the stored heated fluid for refrigeration and/or hot water.

What is claimed is:

1. A flat plate solar compressor comprising a plurality of serially interconnected fluid containing tubes, the first of said tubes being connected to an upstream fluid supply and the last of said tubes being connected to a downstream compressed fluid storage means, each of said tubes being provided with a pressure sensitive release valve, said tubes being arranged with their longitudinal axes parallel, each of said tubes being provided with heat exchanger means, said tubes being located such that the heat from the sun will heat and compress a fluid contained within said tubes, said fluid when sufficiently compressed being released by said release valve to the next downstream tube so that each of said tubes will maintain higher fluid pressure than the previous upstream tube, each said valve in the serially connected arrangement operating to release said compressed fluid at a higher fluid pressure than the immediately preceding valve.

2. A flat plate solar compressor as claimed in claim 1 wherein said fluid is a refrigerant gas.

3. A flat plate solar compressor as claimed in claim 1 wherein said heat exchanger means comprises a constant flow second fluid filled jacket.

4. A flat plate solar compressor as claimed in claim 3 wherein said second fluid is water.

* * * * *